Dec. 22, 1970   W. R. COMBER ET AL   3,548,435
EGG-WASHING MEANS
Original Filed Oct. 27, 1967

INVENTORS
WILLIAM R. COMBER
HARVERD J. HOEKJE

ATTORNEYS

United States Patent Office 3,548,435
Patented Dec. 22, 1970

3,548,435
EGG-WASHING MEANS
William R. Comber, Holland, and Harverd J. Hoekje, Hamilton, Mich., assignors, by mesne assignments, to U.S. Industries, Inc., New York, N.Y., a corporation of Delaware
Original application Oct. 27, 1967, Ser. No. 678,736, now Patent No. 3,453,674, dated July 8, 1969. Divided and this application Feb. 14, 1969, Ser. No. 819,504
Int. Cl. A01k 43/00
U.S. Cl. 15—3.17                                    5 Claims

ABSTRACT OF THE DISCLOSURE

An egg washer of the type in which a conveyor moves eggs through a sequence of washing and drying stations, which includes at one of the washing stations a rotary scrubbing means in the form of a series of disc-like members mounted through their centers on a shaft, to be rotated thereby. These members are made of an abrasive fabric, preferably a mesh made of a synthetic fiber such as a polyester of the type sold commercially under, and widely known by, the trademark "Nylon." Also, a dryer station is provided, in which a single blower creates a current of air divided into a plurality of particular streams by directing vanes such that eggs upon first being brought to the drying station are exposed to a stream of relatively high pressure air which blows free water off one side of the eggs and, after having been turned one-half revolution by the conveying means, the eggs are again exposed to a high pressure stream of air which blows or drives free water off the other side of the eggs. The eggs then continue to travel onward, and are subsequently exposed to air of much milder pressures, which serves to evaporate the light film of water which may yet remain on the eggs after opposite sides thereof have had free water accumulations blown off.

---

This application is a divisional application of the parent application entitled Egg Washing Means, filed Oct. 27, 1967, Ser. No. 678,736 now Patent No. 3,453,674.

BACKGROUND OF THE INVENTION

Automated egg-washing devices were first developed some time ago and various types of such equipment have since been devised to better provide the desired end objective, i.e., eggs which have been thoroughly washed clean of all foreign matter and which have also been dried. Numerous specific approaches have been taken in the design of these various devices, since it is difficult to thoroughly wash an egg over its entire surface and then dry the same using only automated mechanical equipment, without initiating breakage or cracking of the egg shells and also without exceeding the upper and lower temperature variations to which eggs can safely be subjected.

One major area of problems in such egg-washing devices has been in the means employed for scrubbing or scouring the eggs. Here a definite problem exists, since the deposits which must be cleaned from the eggs are for the most part extremely difficult to remove and require a very considerable amount of brushing and scrubbing when ordinary techniques are used. As a result, devices which do a proper job of cleaning generally are accompanied by a high incidence of breakage.

A further area of problems involves the drying of the eggs once they have been through all the washing stations. Numerous different approaches have here been taken, including directing jets of air at the eggs from both above and below them, and in various sequences; however, while it is indeed important to properly dry the eggs, it is also important to minimize the equipment expense. Consequently, redundancy in blowers, along with very elaborate ducting schemes and mechanisms for turning the eggs numerous different ways so as to expose them to different drying jets of air have resulted in equipment which is very elaborate and extremely, even prohibitively, expensive.

SUMMARY OF THE INVENTION

In accordance with the present invention, a greatly improved scrubbing means has been provided which thoroughly and properly cleans the eggs while being extremely gentle to them, and which provides very superior results while at the same time involving an uncomplicated and relatively simple structure, making original installation and subsequent replacement a very economical matter. In essence, this new and superior scrubbing means comprises a series of scrubbing elements of a flexible rough-textured fabric, which have a disc-like form and which are mounted through their centers upon a shaft, to be rotated thereby. These disc-like elements are arranged with respect to eggs moved by a conveyor member such that the periphery of the fabric discs directly contacts the surface of the eggs as the discs are rotatably driven and the eggs are moved therebeneath. Such discs are preferably made of a lightweight and readily flexible extruded mesh or netting formed of the polyester known commercially as "Nylon."

The invention further provides a new drying arrangement for washed and still-wet eggs, in which the output from a single blower stage is divided three ways, i.e., into a pair of jets having a relatively high pressure, and an additional air stream which is merely of a very mild pressure. The two high pressure jets are spaced a particular distance apart with respect to the egg-conveying means, which includes transverse rollers upon which the eggs rest and which carry the eggs along. As these rollers are moved they rotate, and thereby impart a complementary rotation to the eggs which they carry. The spacing of the two high-pressure jets is such that the eggs are rotated approximately one-half turn between the jets; consequently, first one side of the eggs and then the other is subjected to a high-pressure jet of air, whereby free water on each side of the eggs is driven off them. The third stream of low-pressure air is used to evaporate the remaining light film of water from the surface of the eggs after the eggs have been exposed to both high-pressure jets.

DRAWINGS

PREFERRED EMBODIMENT

Figure 1:
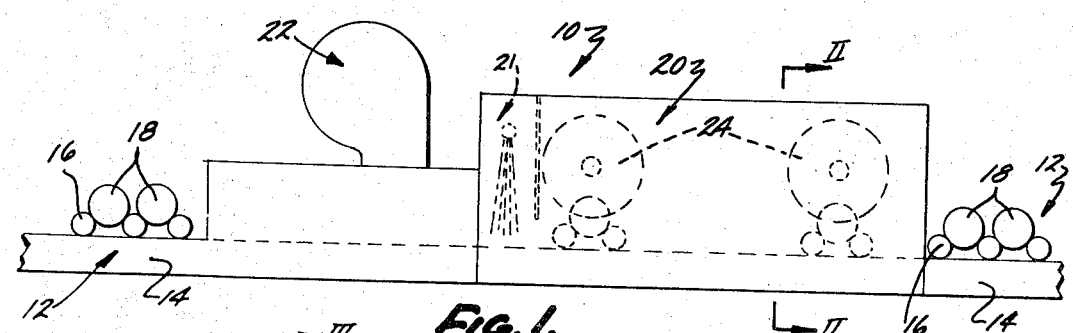
FIG. 1 is a fragmentary side elevation of the washing and drying apparatus of the invention, showing the general nature thereof.

In FIG. 1, the overall nature of the present egg-washing apparatus 10 is illustrated. The apparatus includes a conveyor means 12 having a bed portion 14 and a series of generally cylindrical transverse rollers 16 which ride upon the bed 14, each pair of adjacent rollers carrying a row of eggs 18 which ride upon the rollers, cradled between them. The rows of eggs are carried in this manner through a washing portion 20, a rinsing portion 21, and a drying portion 22 of the apparatus 10, with thoroughly clean and dry eggs emerging on the conveyor after having passed through the drying portion 22.

Indicated in phantom within the washing portion 20 of FIG. 1 are a pair of washing stations, including spaced means 24 for scrubbing the eggs. Spray jets (not specifically shown) for directing streams of washing solutions against the eggs are to be provided at desired locations, preferably both between and on the axis of the two scrubbing means 24.

Figure 2:
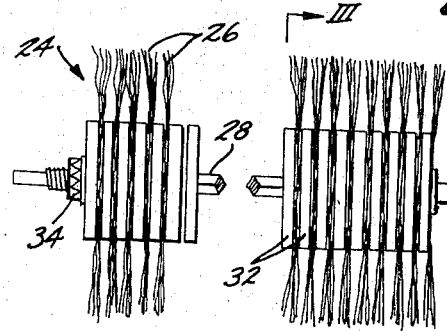
FIG. 2 is an enlarged end elevation of the scrubbing means of the invention, as seen through the vertical plane II—II of FIG. 1.
Figure 3:
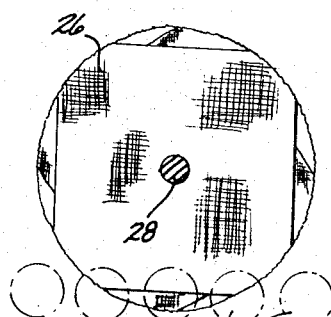
FIG. 3 is a sectional elevation taken through the plane III—III of FIG. 2, showing an individual scrubbing element.

A first embodiment of the scrubbing means 24 is seen in FIGS. 2 and 3. This comprises a plurality of relatively thin, disc-like scrubbing elements 26, each made of a flexible, rough-textured fabric, preferably of the extruded plastic mesh known as "Nylon" net. It is to be understood, however, that other lightweight and somewhat abrasive-textured fabrics made of synthetic filaments or fibers of various polyesters in the general family of which "Nylon" is a member may be equally suitable for this purpose. The numerous disc-like scrubbing elements 26 are mounted on their centers upon a rotatable shaft 28 which is journalled at its opposite end extremities within the washing portion 20 and driven in a rotary manner, through any desired conventional driving arrangement such as a transverse drive pin 30 in the end of shaft 28 which engages a slotted drive shaft or coupling (not specifically shown) and is driven thereby.

When the preferred "Nylon" net material is used for the scrubbing elements 26, several individual such elements, preferably numbering four, are grouped together at numerous individual locations upon the shaft 28. Spacers 32 in the nature of a relatively large and somewhat thick washer are placed on the shaft between each such group of scrubbing elements, such that the various groups of scrubbing elements extending along the length of the shaft are mutually spaced. The shaft 28 is preferably of square cross section, and the spacers 32 have square apertures at their centers for non-rotatively sliding onto the shaft, where both they and the groups of scrubbing elements are held in place by a nut 34 which threads onto one end of the shaft. As will be understood, tightening nut 34 on shaft 28 squeezes the scrubbing elements between the spacers, such that the scrubbing elements cannot rotate with respect to the shaft.

Figure 2A:
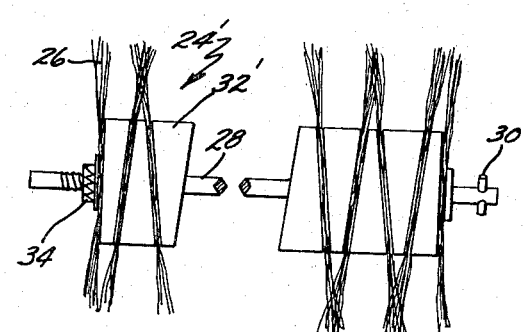
FIG. 2a is an end elevation similar to FIG. 2, but showing an alternate arrangement of the scrubbing means.

An alternate form of spacing for the groups of mesh scrubbing elements 26 is shown in FIG. 2a. Here the same type of drive shaft 28 and same type of scrubbing elements 26 are used, but the spacers 32' do not have parallel flat sides as was true of the spacers 32; instead, the spacers 32' have angularly-disposed sides which, when arranged in the manner shown in FIG. 2a, are such that adjacent groups of scrubbing elements converge (and preferably touch) on one side of the shaft 28 and diverge on the other side of the shaft in an alternating fashion. By arranging the scrubbing elements in this manner, they will move laterally across the surface of the eggs as they are rotated, to heighten the scrubbing effect which they exert upon the eggs. In practice, it has been found that this heightened scrubbing effect is not really required in order to adequately clean the eggs, however; at least so long as the preferred synthetic netting is used to make the scrubbing elements.

Although it is perfectly satisfactory to utilize scrubbing elements 26 which are circular, a satisfactory alternate shape is shown in FIG. 3 which provides advantages of manufacturing economy. Here the discs are made from mesh stock which is initially square in shape, and the four corners thereof are trimmed off along a circular line of common radius, so that the projection of the corners is a circle. The several scrubbing elements in each mutually spaced group thereof are then angularly offset from each other slightly (FIG. 3), so that the corners of the elements overlap in the progressive manner illustrated, such corner portions thus complementing each other to define a circular outer periphery for the entire group of elements. While the exact size (i.e., diameter) of the scrubbing elements is not really a critical matter, their radius should be at least moderately greater than the diameter of the eggs, so that the discs can readily extend over the major portion of the eggs. In order to accomplish this, the shaft 28 should be placed sufficiently close to the conveyor means 12 to allow the circular periphery of the groups of scrubbing elements to extend well below the centerline of the eggs.

As will be understood, even though the scrubbing elements themselves are of a relatively lightweight mesh fabric, the preferred synthetic material is relatively stiff and wiry, even though the actual diameter of its threads or fibers is small. Consequently, the discs tend to retain a flat, generally planar shape even when they are not moving. Further, when they are in actual use they become wetted, and when they are then rotated the effects of centrifugal force augments this tendency. However, since their fabric is actually quite light in weight, the discs are easily deformed when they contact the eggs, and the discs therefore tend to conform themselves to the shape of the eggs passing between or through the various groups of discs, without any noticeable tendency to kick the eggs out of place or unduly shake and agitate them, as would be true of scrubbing elements made from a heavy-bodied fabric. Further, a heavy-bodied fabric would not readily conform itself to the shape of an egg to thoroughly cover the surface thereof, and of course could not spread apart to cover both sides of an egg, as can a plurality of closely-spaced lightweight scrubbing elements.

Figure 4:
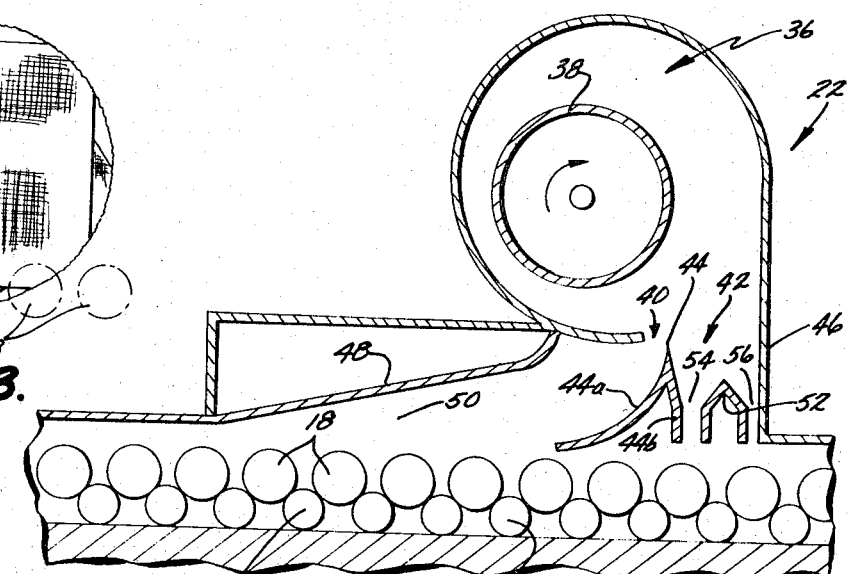
FIG. 4 is an enlarged, fragmentary side elevation of the drying means of the invention.

The novel drying portion 22 of the present apparatus is illustrated in detail in FIG. 4. Here it will be seen that a blower means 36, which may be of a conventional type having a rotary impeller 38, is mounted so as to drive a pressurized stream of air downwardly through a pair of primary outlet passages or ports 40 and 42, which are established by a deflector or vane 44 extending from one side to the other of a discharge plenum 46 located directly beneath the blower 36, to which the latter is mounted. As illustrated, vane 44 has an elongated, rearwardly-sweeping portion 44a which, with an inclined baffle 48, defines an elongated, large-area throat 50 which lowers the pressure of the air stream from the blower at this point by allowing the same to expand over a relatively large area; further, it directs such air over a relatively large number of eggs 18 being carried along by the conveyor means rollers 16.

Deflector or vane 44 has, in addition to its aforesaid long rearward side 44a, a forward side 44b which defines the rearward boundary of outlet passage 42 noted previously. Within this passage is an inverted generally V-shaped baffle 52, which divides the pressurized air flowing into passage 42 into a pair of relatively narrow, laterally elongated passages 54 and 56, each of which is directed straight downwardly at the eggs passing therebeneath passage 56 and drive free water downwardly and 56, being narrow throughout their extent, in effect comprise constrictions in the throat or passage 42, and consequently the air passing downwardly out of these narrow passages is at a relatively high pressure. This serves to blast free water accumulations off the eggs as they pass beneath these passages. Further, the spacing of passages 54 and 56 is coordinated with the size of the conveyor rollers 16, such that the eggs carried thereby are rotated approximately one-half revolution between these two passages. Therefore, the relatively high-pressure air first impinges against eggs located immediately beneath passage 56 and drives free water downwardly off the top half of such eggs as they pass therebeneath. When the same eggs have reached passage 54, the opposite side thereof will thus be positioned at the top, and the downwardly-rushing air through passage 54 will therefore drive free water off the opposite side thereof. When the same eggs reach the throat area 50 where the low-pressure air is directed, the eggs will turn over several times within such air, which then evaporates the remaining thin film of water which the high-pressure air has not completely dissipated. It should be noted that a heating means, such as an electrical heater, may be incorporated into the drying station, as for example by mounting within the plenum 46, so that the air used for drying the eggs is warmed. However, it has been found that the drying system is so efficient that this is not really necessary to do a satisfactory job of drying, except perhaps where extremely humid and cold ambient air is typically encountered.

Thus, in accordance with the invention a very novel and unique form of scrubbing means for eggs is provided, together with a drying means of a similar novel character. The many advantages of these cooperative structures have been indicated, but the superior performance thereof is not likely to be truly appreciated until actually seen in action. It is entirely conceivable that upon becoming familiar with the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. In an apparatus for washing eggs, of the type wherein a conveyor means moves a plurality of eggs through a desired sequence of washing stations, the improvement comprising: a conveyor including spaced roller means for carrying said eggs through said washing stations; means for subjecting such eggs to a scrubbing action at at least one of said stations; said means including at least one rotary shaft member and a plurality of scrubbing elements carried for movement thereby; said scrubbing elements comprising thin polyester mesh members characterized by substantial body flexibility, lightness of weight, and abrasive surface characteristics; and said mesh members arranged with respect to said conveyor means to directly contact a part of each of the eggs moved thereby, to scrub the same as said members are moved by said rotary shaft.

2. The improvement in egg-washing apparatus of claim 1, wherein said polyester mesh members are generally disc-like in form, and wherein said rotary shaft extends transversely through a plurality of said mesh members at their centers of rotation, to rotate the same thereabout.

3. The improvement in egg-washing apparatus of claim 2, wherein said mesh members are mounted on said shaft in mutually spaced groupings.

4. The improvement in egg-washing apparatus of claim 3, wherein at least some of said mesh members are mounted on said shaft such that their plane is convergent with respect to that of another such member.

5. The improvement in egg-washing apparatus of claim 1, wherein said polyester mesh is a unitary, non-woven netting of the type known as "Nylon" net.

References Cited

UNITED STATES PATENTS

| 1,357,794 | 11/1920 | Moe | 15—3.17 |
| 1,706,577 | 3/1929 | Larsen | 15—3.17 |
| 2,566,475 | 9/1951 | Wright | 51—22X |
| 2,627,140 | 2/1953 | Marzolf | 15—3.17X |
| 2,732,987 | 1/1956 | Moore | 15—101X |

EDWARD L. ROBERTS, Primary Examiner

U.S. Cl. X.R.

15—230; 51—22